US010554286B2

United States Patent
Rune et al.

(10) Patent No.: US 10,554,286 B2
(45) Date of Patent: Feb. 4, 2020

(54) METHOD AND CONTROL NODE FOR SUPPORTING TRANSMISSIONS OF REFERENCE SIGNALS IN BEAMS FROM A FIRST NETWORK NODE

(71) Applicant: Telefonaktiebolaget LM Ericsson (publ), Stockholm (SE)

(72) Inventors: Johan Rune, Lidingö (SE); Icaro L. J. Da Silva, Solna (SE); Andres Reial, Malmö (SE)

(73) Assignee: Telefonaktiebolaget LM Ericsson (Publ) (SE)

( * ) Notice: Subject to any disclaimer, the term of this patent is extended or adjusted under 35 U.S.C. 154(b) by 0 days.

(21) Appl. No.: 16/316,916

(22) PCT Filed: Jul. 12, 2016

(86) PCT No.: PCT/SE2016/050712
§ 371 (c)(1),
(2) Date: Jan. 10, 2019

(87) PCT Pub. No.: WO2018/013020
PCT Pub. Date: Jan. 18, 2018

(65) Prior Publication Data
US 2019/0296818 A1    Sep. 26, 2019

(51) Int. Cl.
*H04B 7/02*    (2018.01)
*H04B 7/06*    (2006.01)
(Continued)

(52) U.S. Cl.
CPC ......... *H04B 7/0695* (2013.01); *H04B 7/0617* (2013.01); *H04L 5/0048* (2013.01);
(Continued)

(58) Field of Classification Search
CPC ... H04B 7/0695; H04B 7/0617; H04W 36/06; H04W 72/0446; H04W 16/28; H04L 5/0053; H04L 5/0048; H04L 27/26
See application file for complete search history.

(56) References Cited

U.S. PATENT DOCUMENTS

| | | | |
|---|---|---|---|
| 2011/0085448 A1* | 4/2011 | Kuwahara | H04W 16/10 370/242 |
| 2014/0004897 A1* | 1/2014 | Jung | H04W 72/082 455/509 |
| 2015/0257073 A1* | 9/2015 | Park | H04B 7/0408 370/331 |

FOREIGN PATENT DOCUMENTS

WO    2016051792 A1    4/2016

OTHER PUBLICATIONS

International Search Report and Written Opinion dated Apr. 4, 2017 for International Application No. PCT/SE2016/050712 filed on Jul. 12, 2016, consisting of 10-pages.

* cited by examiner

*Primary Examiner* — Dhaval V Patel
(74) *Attorney, Agent, or Firm* — Christopher & Weisberg, P.A.

(57) ABSTRACT

A method and a control node for supporting transmissions of reference signals in spatially differentiated beams from a first network node of a wireless network. A sequence of beams to be used for transmitting the reference signals is determined based on ability information indicating radio resources which the first network node is able to use for beam transmissions during a predefined time period. The control node then instructs the first network node to transmit reference signals in at least one beam at a time according to the determined sequence of beams. Thereby, it can be avoided that the first network node is instructed to transmit (Continued)

a reference signal in a beam on a radio resource that the first network node is unable to use.

20 Claims, 6 Drawing Sheets

(51) Int. Cl.
*H04L 5/00* (2006.01)
*H04W 72/04* (2009.01)
*H04W 36/06* (2009.01)
*H04W 16/28* (2009.01)
*H04L 27/26* (2006.01)

(52) U.S. Cl.
CPC ........... *H04L 5/0053* (2013.01); *H04W 36/06* (2013.01); *H04W 72/0446* (2013.01); *H04L 27/26* (2013.01); *H04W 16/28* (2013.01)

500A: Ability information

504A: Beam sequence

500B: Ability information

504B: Beam sequence

600: Ability information from node 1

| F1: |    |    | B5 | B5 | B5 |    |    |    |    |    |
|-----|----|----|----|----|----|----|----|----|----|----|
| F2: | B1 | B1 |    |    |    |    | B1 | B1 | B1 |    |
|     | T0 | T1 | T2 | T3 | T4 | T5 | T6 | T7 | T8 | T9 |

Occupied / Free

602: Ability information from node 2

| F1: |    |    |    |    | C5 | C5 | C5 |    |    |    |
|-----|----|----|----|----|----|----|----|----|----|----|
| F2: |    |    |    |    |    |    |    | C2 | C2 | C2 |
|     | T0 | T1 | T2 | T3 | T4 | T5 | T6 | T7 | T8 | T9 |

604: Beam sequence for node 1

F1-B5  F1-B4          F2-B1  F2-B2     F1-B3

| T0 | T1 | T2 | T3 | T4 | T5 | T6 | T7 | T8 | T9 |

606: Beam sequence for node 2

F2-C3  F2-C2       F2-C1       F1-C4  F1-C5

| T0 | T1 | T2 | T3 | T4 | T5 | T6 | T7 | T8 | T9 |

608: Total (aggregated) beam sequence

F1-B5, F1-B4, F2-C3, F2-C2, F2-B1, F2-B2, F2-C1, F1-B3, F1-C4, F1-C5

METHOD AND CONTROL NODE FOR SUPPORTING TRANSMISSIONS OF REFERENCE SIGNALS IN BEAMS FROM A FIRST NETWORK NODE

CROSS-REFERENCE TO RELATED APPLICATIONS

This application is a Submission Under 35 U.S.C. § 371 for U.S. National Stage Patent Application of International Application Number: PCT/SE2016/050712, filed Jul. 12, 2016 entitled "METHOD AND CONTROL NODE FOR SUPPORTING TRANSMISSIONS OF REFERENCE SIGNALS IN BEAMS FROM A FIRST NETWORK NODE," the entirety of which is incorporated herein by reference.

TECHNICAL FIELD

The present disclosure relates generally to a method and a control node for supporting transmissions of reference signals in spatially differentiated beams from a first network node of a wireless network, to enable measurement of the reference signals.

BACKGROUND

In order to increase capacity and performance in a wireless network, a technology has been developed to transmit radio signals in narrow beams by using directed antennas, referred to as beamforming. When high-gain narrow beams are used for transmitting data from a network node to a wireless device, the transmission is concentrated to a narrow area, i.e. beam, inside which the wireless device is deemed to be located. Thereby, the data can reach quite far from the transmitting node without generating too much interference outside the beam, which enables high-data-rate transmission coverage also to very distant wireless devices which could not realistically be achieved with normal sector-wide transmissions, due to their lower antenna gain.

The term "network node" is used herein to denote any radio communication equipment of a wireless network, such as a base station, eNodeB or the like, which is capable of wireless communication with wireless devices. Further, the term "wireless device" is used herein to denote any communication equipment that is capable of wireless communication with a wireless network. Some non-limiting examples of wireless device include mobile phone, smartphone, tablet, laptop computer and Machine-to-Machine, M2M, device. Throughout this disclosure, the term access node could be used instead of network node, and the term Use Equipment, UE, could be used instead of wireless device.

In a wireless network where carriers of relatively high frequencies are deployed for beamforming, the resulting high gain beams are typically narrow and the coverage provided is also more unstable which will likely lead to several mobility related events such as measurement reports and handovers, since the Signal to Interference and Noise Ratio, SINR, of the transmitted radio signals may fluctuate and decrease rapidly. Whenever handover is performed in such a network, for example from one network node to another or from one carrier frequency to another, a favorable beam direction needs to be found at the handover target, such as a new network node or a new carrier frequency, towards the wireless device, e.g. in order to sustain a transmission with high data rate. Furthermore, if very high-gain narrow beamforming is employed, even synchronization or exchanging some initial control-signaling messages at the handover target may require that a favorable beam direction has been selected in advance in order for the network node and the wireless device to "hear" each other sufficiently well.

In order to find a favorable beam direction at the handover target, a so-called beam sweep procedure is typically employed. A typical example of a beam sweep procedure is that the network node forms a beam containing a synchronization signal and/or beam identification signal, in each reasonably likely direction, one direction at a time, and the wireless device may measure the signal and report back to the network which beam(s) it could detect and hear well. FIG. 1 illustrates a conventional procedure of transmitting reference signals from a network node 100 in a succession of beams denoted B1-B5 where the different beams B1-B5 may have different beam identities. The reference signals are transmitted in time intervals, such as timeslots or similar, such that transmission is done in beam B1 during a first time interval T1, in beam B2 during a next time interval T2, and so forth, as indicated in the figure.

Some suitable beam reception quality metrics that could be used in this context may include the received power or SINR which is measured and reported by the wireless device. The reporting may be transmitted from the wireless device either over an already existing connection, e.g. with the old network node or old frequency band, or over a link using the newly found beam at the handover target. In inter network node handover scenarios the candidate beams included in the beam sweep may be transmitted by multiple potential target network nodes, which may also be referred to as candidate network nodes.

In case there are multiple potential candidate network nodes that should be evaluated for handover of a wireless device, a controlling entity may request the candidate network nodes to transmit certain reference signals such as beam identification signals in certain beams according to a beam sweep. The wireless device that is considered for handover is preferably informed of which reference signals to listen for and preferably also the time intervals in which the candidate beams are to be transmitted. Optionally, the wireless device may also be informed of the order in which the reference signals will be transmitted, e.g. which reference signal that will be transmitted in which time interval.

However, the beamforming and beam transmission capability of a network node is limited, e.g. due to transmit power limitations, and beam transmission resources may be scheduled or needed for other purposes as well, such as transmissions to already connected wireless devices or beam sweeps for other wireless devices which potentially will be handed over to the network node, e.g. from yet another network node. Due to any of the above circumstances, it may well happen that a candidate network node already has all its beam transmission capabilities occupied in a time interval where it is required to transmit a candidate beam. It is thus a problem that a network node may sometimes not be able to transmit a reference signal in one or more beams and time intervals as dictated by a given beam sweep.

SUMMARY

It is an object of embodiments described herein to address at least some of the problems and issues outlined above. It is possible to achieve this object and others by using a method and a control node as defined in the attached independent claims.

According to one aspect, a method for supporting transmissions of reference signals in spatially differentiated beams from a first network node of a wireless network is provided, so as to enable measurement on the reference signals by any wireless device receiving the reference signals. The method is performed by a control node. In this method, the control node obtains ability information from the first network node. The ability information indicates radio resources which the first network node is able to use for beam transmissions during a predefined time period. The control node then determines, based on the obtained ability information, a sequence of beams to be used for transmitting the reference signals from the first network node during the predefined time period, and instructs the first network node to transmit reference signals in at least one beam at a time according to the determined sequence of beams.

According to another aspect, a control node arranged to support transmissions of reference signals in spatially differentiated beams from a first network node of a wireless network is provided, so as to enable measurement on the reference signals by any wireless device receiving the reference signals. The control node is configured to obtain ability information from the first network node. The ability information indicates radio resources which the first network node is able to use for beam transmissions during a predefined time period. The control node is also configured to determine, based on the obtained ability information, a sequence of beams to be used for transmitting the reference signals from the first network node during the predefined time period, and to instruct the first network node to transmit reference signals in at least one beam at a time according to the determined sequence of beams.

According to another aspect, a method for supporting transmissions of reference signals in spatially differentiated beams from a first network node of a wireless network is provided, so as to enable measurement on the reference signals by any wireless device receiving the reference signals. The method is performed by a control node. In this method, the control node sends an indication of a proposed sequence of beams to the first network node, and instructs the first network node to transmit, when the proposed sequence of beams is accepted by the first network node, a reference signal in at least one beam at a time according to the proposed sequence of beams.

According to another aspect, a control node arranged to support transmissions of reference signals in spatially differentiated beams from a first network node of a wireless network is provided, so as to enable measurement on the reference signals by any wireless device receiving the reference signals. The control node is configured to send an indication of a proposed sequence of beams to the first network node, and to instruct the first network node to transmit, when the proposed sequence of beams is accepted by the first network node, a reference signal in at least one beam at a time according to the proposed sequence of beams.

A computer program is also provided comprising instructions which, when executed on at least one processor, cause the at least one processor to carry out either of the above methods. A carrier is also provided which contains the above computer program, wherein the carrier is one of an electronic signal, optical signal, radio signal, or computer readable storage medium.

The above method and control node may be configured and implemented according to different optional embodiments to accomplish further features and benefits, to be described below.

BRIEF DESCRIPTION OF DRAWINGS

The solution will now be described in more detail by means of exemplary embodiments and with reference to the accompanying drawings, in which.

DETAILED DESCRIPTION

Figure 1:
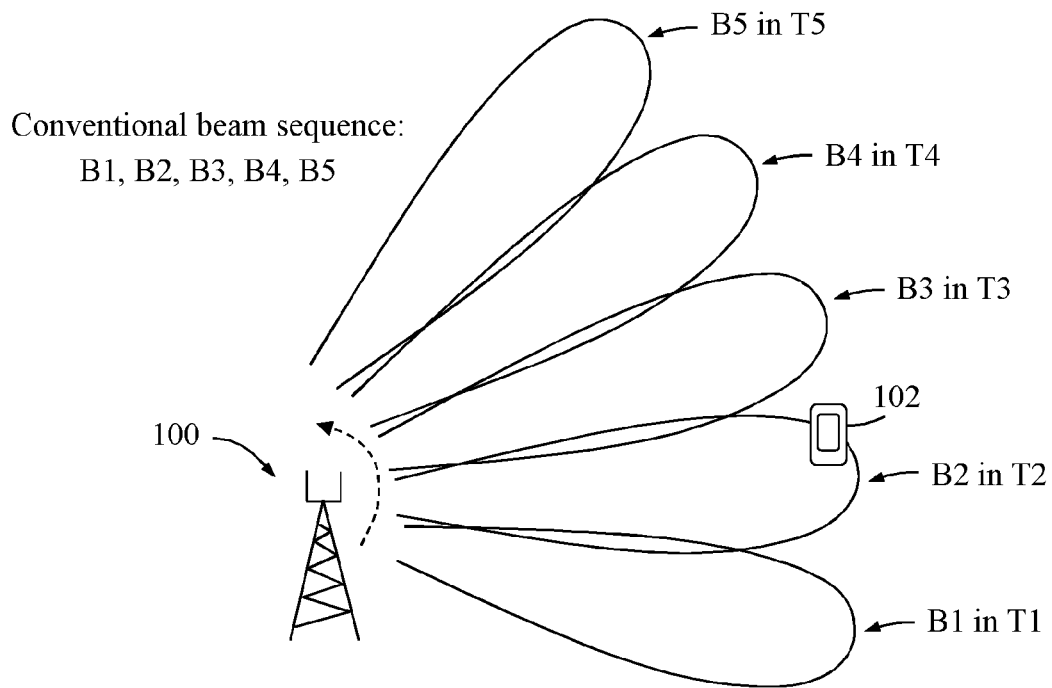
FIG. 1 is a communication scenario illustrating how a network node transmits reference signals in different beams, according to the prior art.

Briefly described, a solution is provided that can be used to basically avoid the situation where a network node is required to transmit a reference signal in a particular candidate beam and during a particular time interval when the network node is not able to do so, e.g. when the candidate beam is already occupied by some other transmission during that time interval. This can basically be achieved by determining a sequence or succession of candidate beams for transmission of reference signals based on ability information that indicates which radio resources the network node is able to use for beam transmissions, and instructing the network node to transmit reference signals in beams ordered according to the determined beam sequence. The candidate beams may be transmitted successively in an order specified in the beam sequence, and used for transmission of reference signals. The beam sequence may specify that the beams should be transmitted one by one, i.e. in one direction at a time, or that more than one beam e.g. two or more beams or multiple beams may be transmitted at a time, i.e. that beams may be transmitted in more than one direction, e.g. two or more directions or multiple directions, at a time.

The number of directions in which a network node may transmit beams at a time depends on hardware configuration. A network node using analogue beamforming may only be capable of transmitting in one beam direction at a time, while a network node using full digital beamforming may be capable of transmitting in an arbitrary number of beam directions simultaneously. In addition to the ability to direct the transmission, the compound transmission power for all beams may be a limiting factor.

It is an advantage of this solution that the sequence of candidate beams is more likely to be useful for the network node to transmit reference signals, as compared to a beam sequence that has been configured arbitrarily without consideration of what radio resources are actually available in the network node. Another advantage is that the risk of missing a potentially good but not measured candidate beam that could be used by a wireless device for communication of data or messages, is reduced. The solution thus enables transmission of the reference signals in essentially all beams in the beam sequence, so that the beams can be evaluated for communication based on measurements on the reference signals.

This ability information is obtained from the network node, thus enabling the network node to ensure that the sequence of candidate beams is useful for transmitting the reference signals. It is also possible to determine an "aggregated" or total beam sequence for two or more network nodes based on ability information from each network node, so that the network nodes are able to transmit reference signals in a coordinated manner according to the aggregated beam sequence. In this case the beam sequence involves a succession of candidate beams that multiple network nodes should use for transmitting reference signals. An example of how such an aggregated beam sequence may be determined will be described later below with reference to FIG. 6. Note that the term "beam sequence" as used herein may, in addition to the succession order, i.e. the order in which the beams in the sequence of beams are transmitted, also include or define information about the time and/or frequency (e.g. subcarriers) for the transmission of each of the beams in the sequence.

The solution will be described and defined herein with reference to functionality in a control node which should be seen as a logic entity that could be implemented in a central node that operates to control the transmission of reference signals in candidate beams from multiple network nodes. The control node could also be implemented in a network node such as the network node that will use the sequence of candidate beams for transmitting reference signals, or in some other network node to assist a possible handover of a wireless device to the network node that transmits the reference signals.

Figure 2:
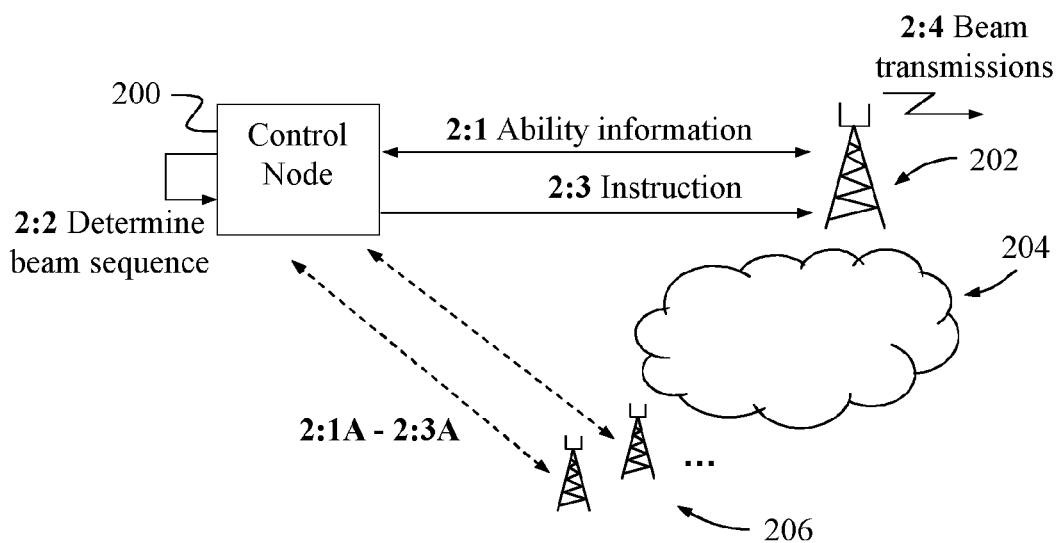
FIG. 2 is a communication scenario illustrating an example of how the solution may be employed, according to some possible embodiments.

FIG. 2 illustrates an example communication scenario where the solution can be used as follows. It is assumed that beamforming is employed for transmitting reference signals in separate candidate beams according to a beam sequence, to enable wireless devices to perform measurements on the reference signals, e.g. for evaluating how useful the candidate beams are for radio communication. The purpose or technique for performing such signal measurements as such is however outside the scope of this solution which is rather directed to how the beam sequence is determined and employed. The solution is thus not limited to any particular usage of the transmitted reference signals which will therefore not be described herein any further.

In FIG. 2 a control node 200 operates to control a first network node 202 of a wireless network 204 to transmit reference signals in different beams according to a certain sequence or succession of candidate beams which is determined to ensure or enable that the first network node 202 can actually use that beam sequence for transmission of reference signals. The term "candidate beams" implies that the beams can be evaluated for future radio communication by a wireless device for which a good or even the "best" beam may be selected for use, i.e. one that provides a sufficient or best signal quality. The process of selecting a beam for radio communication is however outside the scope of this description.

A first action 2:1 illustrates that the control node 200 receives and obtains ability information from the first network node 202, e.g. after sending an ability request, not shown, for such information to the network node 202. The first network node 202 may alternatively upload its ability information to a server or the like from which it could be retrieved by the control node 200.

The ability information indicates, directly or indirectly, radio resources which the first network node 202 is able to use for beam transmissions of reference signals during a predefined time period. The predefined time period may for example have been specified in the above-mentioned ability request, or the predefined time period may have been configured in the first network node 202 in a suitable manner. For example, the available radio resources may be defined in the ability information in terms of free time intervals, e.g. timeslot numbers in a radio frame, and carrier frequency if different carrier frequencies can be used. The radio resources may optionally also be defined in terms of beam directions specified by beam identities, e.g. in case the first network node 202 applies beamforming in other communications, which other communications may be occupying one or more individual beams.

Further, the ability information may explicitly indicate only available radio resources or only unavailable radio resources, or both. For example, if only unavailable radio resources are explicitly indicated in the ability information, the available ones can be implicitly derived as the remaining radio resources in the predefined time period.

In a next action 2:2, the control node 200 uses the obtained ability information as a basis to determine the beam sequence to be used for transmitting the reference signals from the first network node 202 at specific time intervals within the predefined time period. In particular, the control node 200 has the possibility to include candidate beams in the beam sequence to be transmitted in time intervals that are indicated as available in the obtained ability information.

Another action 2:3 illustrates that the control node 200 sends to the first network node 202 an instruction to transmit reference signals in at least one beam at a time according to the determined beam sequence. This instruction thus specifies both in which beams to transmit the reference signals and the respective time intervals during which they should be transmitted. The instruction may also specify on which frequency, e.g. on which subcarrier or subcarriers or on which frequency band, e.g. specified in terms of carrier frequency, each reference signal should be transmitted in embodiments where different frequencies, such as different Orthogonal Frequency Division Multiplex (OFDM) subcarriers or different frequency bands, e.g. in terms of carrier frequencies in the case of a inter-frequency handover, are applicable. In other words, the instruction may thus specify on which subcarrier or subcarriers or on which frequency band or carrier frequency reference signals should be transmitted in the beams. In the following, the terms "frequency" and "frequencies" should generally be understood to mean a frequency or frequencies that define some range or ranges of frequencies, e.g. in terms of the above given examples, that apply for the transmission of a beam or beams.

A final action 2:4 further illustrates that the first network node 202 transmits its reference signals according to the beam sequence in the instruction. Thereby, the first network node 202 should be able to use all the beams and corresponding time intervals in the beam sequence as radio resources for transmission of reference signals since they were chosen from the radio resources that were indicated as available in the ability information.

The control node 200 may also coordinate beam transmissions from multiple network nodes situated in a given area, by determining a similar beam sequence to be used by one or more other network nodes 206 of the wireless network 204, as indicated by additional corresponding actions 2:1A-2:3A that could be performed in parallel with the above-described actions 2:1-2:3. In this case, an aggregated beam sequence may be determined for the network nodes 202, 206 meaning that for each network node there is a corresponding subset of different candidate beams in different time intervals, each subset being useful for transmitting reference signals from the respective network node. In other words, each network node 202, 206 should use a respective subset of candidate beams for the transmission of reference signals.

An example of how the solution may be employed in terms of actions performed in a control node, such as the control node 200 of FIG. 2, for supporting transmissions of reference signals in spatially differentiated beams from a first network node of a wireless network to enable measurement on the reference signals by any wireless device receiving the reference signals, will now be described with reference to the flow chart in FIG. 3. Reference will also be made, without limiting the features described, to elements in the example shown in FIG. 2.

In this procedure it is assumed that a first network node 202 is capable of employing beamforming for transmitting reference signals in different candidate beams according to a given beam sequence which is provided from the control node 200. It is also assumed that the first network node 202 will transmit its reference signals in candidate beams according to a beam sequence within a certain predefined time period.

Figure 3:
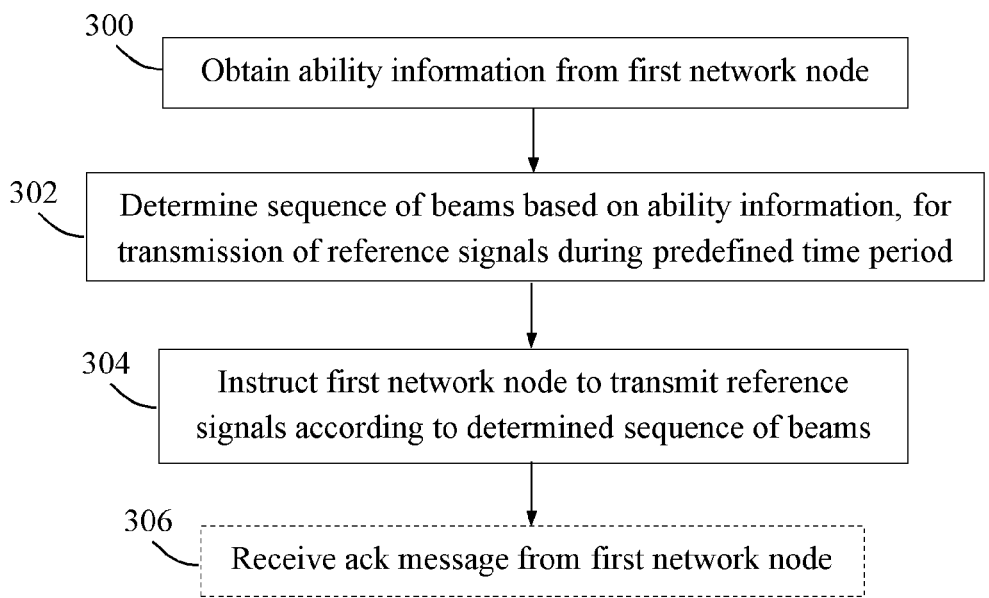
FIG. 3 is a flow chart illustrating a procedure in a control node, according to further possible embodiments.

The procedure illustrated by FIG. 3 can thus be used to accomplish the functionality and benefits described above. In this description, the term "spatially differentiated beams" should be understood to mean that the beams have different individual directions whereby the radio coverage of each beam is different than that of the other beams, e.g. as illustrated in FIG. 1, which is a well-known feature as such in the field of beamforming. For example, two adjacent beams may have more or less partly overlapping coverage in their adjoining outskirts, or no overlap at all. "Geographically separated beams" and "individual coverage areas" are examples of alternative terms that could also be used herein.

A first action 300 illustrates that the control node 200 obtains ability information from the first network node 202, basically corresponding to action 2:1 above. The obtained ability information indicates radio resources which the first network node 202 is able to use for beam transmissions during a predefined time period. As mentioned above, the predefined time period may have been specified in an ability request sent to the first network node 202, or it may have been preconfigured in the first network node 202.

In a next action 302, the control node 200 determines, based on the obtained ability information, a sequence of beams to be used for transmitting the reference signals from the first network node 202 during the predefined time period. Here, the term "sequence of beams" implies that the beams are to be used in succession over time, thus forming a series of beams being transmitted at a series of occasions in time. One beam may follow directly, e.g. immediately, after a previous beam, or there may be a gap in time between the two successive beams. The beams may be transmitted one by one at the different time occasions, or there may be more than one beam transmitted at at least some of the occasions in time.

Some examples of how the sequence of beams could be determined based on ability information will be described later below. Another action 304 illustrates that the control node 200 instructs the first network node 202 to transmit reference signals in at least one beam at a time according to the determined sequence of beams. Optionally, the first network node 202 may return a message to the control node, as shown in an optional action 306, to acknowledge that the sequence of beams is acceptable and will be used by the first network node 202.

Figure 4:
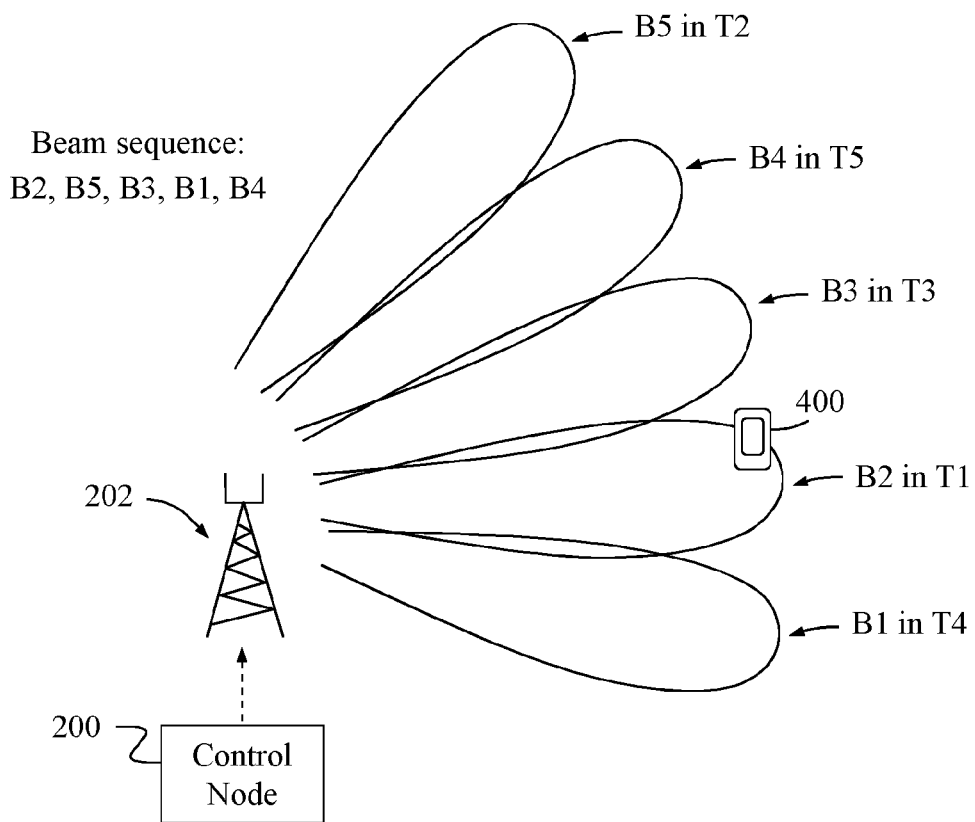
FIG. 4 is a communication scenario illustrating how a network node transmits reference signals in different beams, according to further possible embodiments.

Some non-limiting example embodiments that can be used in the above procedure, will now be described. In one example embodiment, the determined sequence of candidate beams may stipulate or specify time intervals for transmitting beams of said sequence of beams. More specifically the sequence of candidate beams may also specify for each candidate beam a corresponding time interval for transmitting the respective candidate beam. The time interval may be defined in terms of duration and occurrence in time. FIG. 4 illustrates an example of a beam sequence that the control node 200 instructs the network node 202 to use, as of the above action 304. In this case, the beams to be transmitted from network node 202 are identified by beam identities denoted B1, B2, B3, B4, B5, and the consecutive time intervals in which the beams will be transmitted are denoted T1, T2, T3, T4, T5.

Depending on the obtained ability information which directly or indirectly indicates available radio resources in terms of beams and time intervals, the beam sequence determined for network node 202 in this example specifies or stipulates the following:

A reference signal should be transmitted in beam B2 during the first time interval T1.

A reference signal should be transmitted in beam B5 during the next time interval T2.

A reference signal should be transmitted in beam B3 during the following time interval T3.

A reference signal should be transmitted in beam B1 during the following time interval T4.

A reference signal should be transmitted in beam B4 during the last time interval T5.

The sequence of beams in this example is thus T1:B2, T2:B5, T3:B3, T4:B1, T5:B4. This particular sequence of beams has thus been determined based on ability information from the network node 202, basically as of action 302, which will not be described here again for simplicity.

In the above example the sequence of beams thus stipulates an order of transmission of the different beams and for each beam a corresponding time interval during which the respective beam is to be transmitted. In another example embodiment, the determined sequence of candidate beams may, in addition to a possible time interval, stipulate or specify a frequency, or frequency range(s), for transmitting each candidate beam of said sequence of beams. This frequency information may have the form of a set of subcarriers (e.g. Orthogonal Frequency Division Multiplex (OFDM) subcarriers), a frequency range, a single frequency (forming the center of a preconfigured, e.g. standardized, frequency range) or a frequency band (e.g. in the case of a potential inter-frequency handover).

As mentioned, the frequencies (e.g. subcarriers, such as OFDM subcarriers), or frequency range (e.g. bandwidth and center frequency), to be used for transmitting the reference signal in the different beams may be preconfigured, e.g. standardized, but it is also possible that this is dynamically assigned. In such a case the ability information may be complemented with frequency information and the specification of a determined beam sequence may also be complemented with frequency information. The above example sequence of beams may then be specified as T1:F1 T2:F2: B5, T3:F3:B3, T4:F4:131, where F1, F2, F3 and F4 represent frequency information as described above (i.e. for example in the form of subcarriers). Note that F1, F2, F3 and F4 may all be the same, but they may also be different.

FIG. 4 further illustrates that a wireless device 400 is located in the coverage area of beam B2, so that the wireless device 400 is able to measure a received reference signal when transmitted by the network node 202 during time interval T1 in beam B2. It should be noted that the time intervals T1-T5 may or may not be continuous. It was mentioned above that one beam may follow directly or immediately after a previous beam with no time gap in between, or there may be a time gap between the two successive beams. One or more time gaps with no transmission of a reference signal may thus occur within the sequence of beams. Also, the duration of the time intervals T1-T5, i.e. the total duration from start of T1 to end of T5, may fill or cover the entire predefined time period, or it may be shorter than the predefined time period by starting later and/or ending sooner than the predefined time period. Furthermore, the sum of all the time intervals in the beam sequence may be shorter than the predefined time period, even though the total duration T1 to T5 could fill the entire predefined time period, which would be the case when there are time gaps in the in the beam sequence. Such time gaps are thus included in the total duration from start of T1 to end of T5 but not in the sum of time intervals T1-T5. Some examples of how the time intervals for transmission of reference signals in candidate beams could be configured, will be described later below.

In another example embodiment, the time intervals may be specified for the beams of the determined sequence of beams in terms of at least one timeslot of a radio frame. Usually in the field of wireless communication, a repeatable radio frame comprises ten subframes where each subframe extends over two timeslots and typically has a duration of 1 millisecond, ms, so that one radio frame has a total duration of 10 ms. Different communications may thus be scheduled at least in terms of subframes and/or timeslots and also in terms of beams so that a timeslot or a subframe may be scheduled for a transmission in a specific beam. Each beam of a network node may be identified by a beam identity which may also be node-specific such that the beam identity indicates which network node should use the corresponding beam, if applicable.

In another example embodiment, the determined sequence of beams may further specify that the reference signals in at least two beams of said sequence of beams should be transmitted on different frequencies. The scheduling of a transmission of a reference signal in a candidate beam, may thus be defined by time interval (e.g. subframe or timeslot), frequency and beam identity.

In further example embodiments, the obtained ability information may identify beams and time intervals within the predefined time period and indicate whether the identified beams and time intervals are available or unavailable for transmissions by the first network node 202. It was mentioned above that radio resources may be defined in the ability information in terms of beam direction (e.g. a beam identity), time interval (e.g. a subframe number in a radio frame) and frequency (unless the frequency is preconfigured, e.g. standardized), and that each radio resource may be explicitly indicated as being available or unavailable. In another example embodiment, the obtained ability information may thus further indicate frequencies of the available or unavailable beams In another example embodiment, the first network node 202 may be instructed to transmit beam-specific reference signals in the respective beams of said sequence of beams, to enable identification of the respective beams by any wireless device receiving the transmissions, e.g. the wireless device 400 in FIG. 4. Thus, different reference signals will be transmitted by the first network node 202 in the respective beams in this embodiment.

It was mentioned above that control node 200 may coordinate beam transmissions from multiple network nodes situated in a given area, e.g. when two or more network nodes are located so close to one another that a beam transmission from one network node may in some way affect a simultaneous communication to or from another network node, e.g. by collision or interference. In further example embodiments, the sequence of beams may thus be determined further based on scheduling of transmissions to or from other network nodes of the wireless network so that any collisions or interference with the other transmissions are avoided or minimized when the first network node 202 transmits reference signals according to said sequence of beams.

As mentioned above, another example embodiment is that obtaining the ability information, as of action 300, may comprise sending to the first network node 202 an ability request indicating the predefined time period. The first network node 202 may then send its ability information to the control node 200 in response to the ability request.

In another example embodiment, the determined sequence of beams may have shorter duration than the predefined time period, which was also mentioned above. A further example embodiment is that the determined sequence of beams may comprise one or more time gaps where no reference signal is to be transmitted. It was mentioned above that the sum of all the time intervals in the beam sequence may be shorter than the total duration of the beam sequence due to the occurrence of such time gaps, and that the total duration could fill the entire predefined time period even when the sum of time intervals does not.

In further example embodiments, the obtained ability information may be independent of the beams (e.g. of the beam directions) and rather indicate availability of resources for transmission of any beam (i.e. any beam direction). In such a case, the radio resources, whose availability or unavailability is indicated, may be defined in the ability information in terms of only time interval (e.g. a subframe number in a radio frame) and frequency (unless the frequency is preconfigured, e.g. standardized). This may be the case, e.g. if the first network node 202 is unable to transmit more than one beam at a time. This may be the case, e.g. for a network node (e.g. the first network node 202) using analogue beamforming. Another example where this may be the case is when the transmission power limitation prevents simultaneous parallel transmissions, i.e. if the network node (e.g. the first network node 202) does not have enough transmission power available to transmit any other transmission (e.g. in another beam) simultaneously with the reference signal to be transmitted in a beam of the concerned sequence of beams. The latter, i.e. the potential transmit power limitation, may depend on the required power for transmission of a beam in the concerned sequence of beams. Optionally, to aid the network node, e.g. the first network node 202, to determine whether the transmission power limitation prevents simultaneous parallel transmission, the control node may include an indication of the transmission power to be used for the beams in the sequence of beams in the request for ability information. Another option could be that it is predetermined that the network node, e.g. the first network node 202, always should use full transmission power for beams in sequence of beams used for this purpose. Yet another option could be that using full transmission power is the default, but that this could be overridden by a transmission power indication in the request for ability information from the control node.

Some examples of how the determined sequence of beams may be configured for a network node, referred to as the first network node 202, will now be described in more detail with reference to FIGS. 5A and 5B. It is assumed that the predefined time period 502 extends over a time period of ten time intervals denoted T0-T9 which may correspond to subframes comprised in a radio frame. It is also assumed that the first network node 202 should be instructed to transmit reference signals in five different candidate beams with beam identities B1-B5.

Figure 5A:
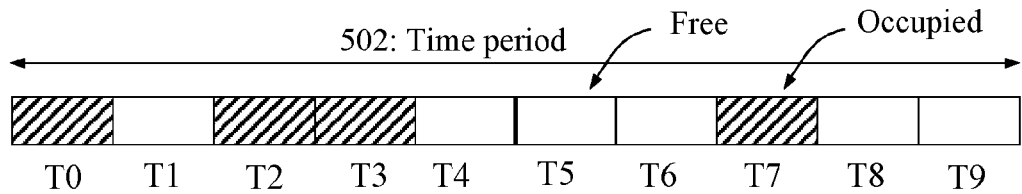
FIGS. 5A and 5B are diagrams illustrating two examples of how a beam sequence may be configured for transmission of only one beam at a time by a network node, according to further possible embodiments.
Figure 5A:
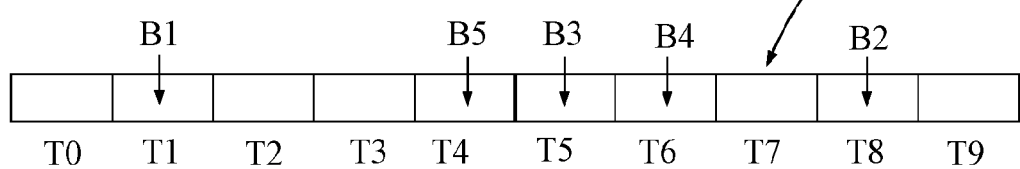

In FIG. 5A, the ability information 500A obtained from the first network node 202, e.g. as described above for action 300, indicates that time intervals T0, T2, T3 and T7 will be occupied with other communications during the given time period 502, as indicated by striped blocks in the figure, so that these time intervals are unavailable for transmission of reference signals in candidate beams. In this example, the ability information 500A is not beam-specific and it can thus be assumed for simplicity that the time intervals T0, T2, T3 and T7 will be occupied by transmissions not using beamforming. This means that the remaining time intervals T1, T4, T5, T6, T8 and T9 are "free" and thus available for transmission of reference signals in candidate beams. The control node 200 is thereby able to configure and determine a beam sequence by selecting any of the free time intervals T1, T4, T5, T6, T8 and T9 for transmission of reference signals in different beams.

In this example the determined beam sequence 504A dictates that a reference signal should be transmitted in beam B1 during time interval T1, in beam B5 during time interval T4, in beam B3 during time interval T5, in beam B4 during time interval T6, and in beam B2 during time interval T8. The beam sequence 504A thus extends from start of time interval T1 to end of time interval T8 which is shorter than the predefined time period 502 extending over time intervals T0-T9. Further, three time intervals T2, T3 and T7 within the beam sequence 504A are not used for transmission of reference signals, thus forming time gaps in the beam sequence 504A. The sum of the used time intervals T1, T4, T5, T6 and T8 is therefore shorter than the total duration of the beam sequence 504A from T1 to T8, due to the occurrence of time gaps in the unused time intervals T2, T3 and T7.

Figure 5B:
Figure 5B:
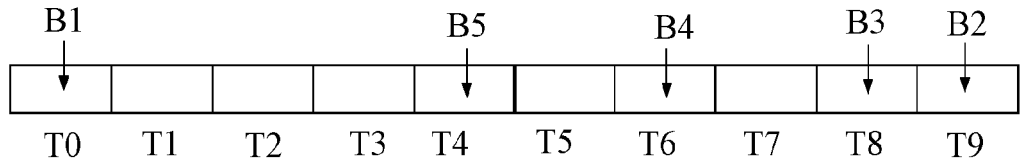

In FIG. 5B, the ability information 500B obtained from the first network node 202 indicates that time intervals T2, T3, T5 and T7 will be occupied with other communications during the predefined time period 502, thus making these time intervals unavailable for transmission of reference signals in candidate beams. This means that the remaining time intervals T0, T1, T4, T6, T8 and T9 are available for transmission of reference signals in candidate beams. The control node 200 is thereby able to configure and determine a beam sequence by selecting any of the free time intervals T0, T1, T4, T6, T8 and T9 for transmission of reference signals in different beams.

In this example the determined beam sequence 504B dictates that a reference signal should be transmitted in beam B1 during time interval T0, in beam B5 during time interval T4, in beam B4 during time interval T6, in beam B3 during time interval T8, and in beam B2 during time interval T9. The beam sequence 504B thus extends from start of time interval T0 to end of time interval T9 which thereby fills the entire predefined time period 502. Further, five time intervals T1, T2, T3, T5 and T7 within the beam sequence 504A are not used for transmission of reference signals, thus forming time gaps in the beam sequence 504A. Consequently, the sum of the used time intervals T0, T4, T6, T8 and T9 is therefore shorter than the total duration of the beam sequence 504A from T0 to T9, due to the occurrence of time gaps in the unused time intervals T1, T2, T3, T5 and T7.

An example of how an aggregated sequence of beams may be configured for two network nodes, referred to as "node 1" and "node 2" for short, will now be described with reference to FIG. 6. As in the previous examples, it is assumed that the predefined time period extends over a time period of ten time intervals denoted T0-T9. It is also assumed that node 1 should be instructed to transmit reference signals in five candidate beams with beam identities B1-B5, and also that node 2 should be instructed to transmit reference signals in five candidate beams with beam identities denoted C1-C5 which are thus distinct from B1-B5 since the beams are formed by different network nodes 1 and 2, respectively. It can thus be said that the above beam identities are node-specific since the beam identities B1-B5 denote beams that can be used by node 1 while the beam identities C1-C5 denote beams that can be used by node 2. In this example, two different frequencies F1 and F2 can further be used by the network nodes for beam transmissions. To be more specific, the frequencies F1 and F2 may for example be center frequencies of respective frequency ranges used for beam transmissions, herein referred to as a frequencies for short. Note that such a frequency range may be e.g. a set of OFDM subcarriers.

The ability information 600 obtained from node 1 indicates that time intervals T2, T3 and T4 will be occupied with other communications on beam B5 using the frequency F1, and that time intervals T0, T1, T6, T7 and T8 will be occupied with other communications on beam B1 using the frequency F2. Hence, the above occupied time intervals and beams are unavailable for transmission of reference signals using frequencies F1 and F2, respectively, while the blank blocks in the ability information 600 indicate available radio resources. In this example, the ability information 600 is thus both beam-specific and frequency-specific.

The ability information 602 obtained from node 2 indicates that time intervals T4, T5 and T6 will be occupied with other communications on beam C5 using the frequency F1, and that time intervals T7, T8 and T9 will be occupied with other communications on beam C2 using the frequency F2. Hence, the above time intervals and beams are unavailable for transmission of reference signals using frequencies F1 and F2, respectively, while the blank blocks in the ability information 602 likewise indicate available radio resources.

Figure 6:
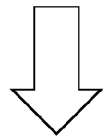
FIG. 6 is a diagram illustrating another example of how a beam sequence may be configured for coordinated transmission of beams by two network nodes, according to further possible embodiments.

Note that a network node, e.g. node 1 or node 2 in the example of FIG. 6, may also indicate that the same time interval, e.g. the same timeslot, and frequency is occupied by transmissions in more than one beam. For example, if this had been the case, the ability information from node 1 in FIG. 6 could have indicated that on frequency F1 time interval T4 is occupied by transmissions in both beam B3 and beam B5. Similarly, a network node may also indicate that multiple frequencies, such as F1 and F2 in the example of FIG. 6, are occupied by transmissions in one or more beams in the same time interval, e.g. the same timeslot, on each of the multiple frequencies. For example, if this had been the case, the ability information from node 1 in FIG. 6 could have indicated that on frequency F1 time interval T4 is occupied by transmissions in both beam B3 and beam B5 and on frequency F1 time interval T4 is occupied by transmission in beam B1.

Note also that even though the example of FIG. 6 shows that node 1 and node 2 indicate only occupancy by transmissions in the beams which are supposed to be included in the sequence of beams, i.e. in the beam sweep, this is not the only possibility. A network node, such as node 1 and node 2 in the example of FIG. 6, may also indicate occupancy by transmissions in other beams than the ones to be included in the sequence of beams, i.e. in the beam sweep. As an example, if the control node, in the request for ability information sent to a network node, includes indications of the beams in the sequence of beams that the network node is expected to transmit reference signals in in the sequence of beams, then the network node may typically respond with ability information indicating occupancy, i.e. indicating resources that are occupied by transmissions, only among the beams indicated in the ability request (or, alternatively or additionally, indicate resources which are not occupied by transmissions among the concerned beams). However, if the ability information request from the control node does not include any indications of the beams the network node is expected to transmit reference signals in in the sequence of beams (beam sweep), the network node may indicate occupancy, i.e. indicating resources that are occupied by transmissions, for all beams, i.e. also for beams that are not planned to be used in the sequence of beams (or, alternatively or additionally, indicate resources which are not occupied by transmissions for all beams). As an optional optimization, the network node may exclude some beams from the ability information, if the network node knows, from configuration or experience, that these beams cannot be (or are highly unlikely to be) candidate beams for the concerned handover.

As a result of the ability information provided by node 1 and node 2, the free time intervals T0, T1, T5-T9 on frequency F1 and time intervals T2-T5, T9 on frequency F2 are available for transmission of reference signals in candidate beams by node 1, and the free time intervals T0-T3, T7-T9 on frequency F1 and time intervals T0-T6 on frequency F2 are available for transmission of reference signals in candidate beams by node 2. Furthermore, as the ability information in this example is beam specific and include beam specific occupancy indications, the ability information from node 1 also indicates that time intervals T2-T4 on frequency F1 are available for transmission of reference signals in any other beam than B5 and time intervals T0, T1 and T6-T8 on frequency F2 are available for transmission of reference signals in any other beam than B1. Likewise, the ability information from node 2 also indicates that time intervals T4-T6 on frequency F1 are available for transmission of reference signals in any other beam than C5 and time intervals T7-T9 on frequency F2 are available for transmission of reference signals in any other beam than C2.

The control node 200 is thereby able to configure and determine an aggregated beam sequence by selecting any of the above free time intervals for transmission of reference signals in different beams by nodes 1 and 2, respectively.

FIG. 6 illustrates a first beam sequence 604 for node 1 comprising a first subset of beams to be used by node 1 for transmission of reference signals. This beam sequence 604 dictates that a reference signal should be transmitted in beam B5 on frequency F1 during time interval T0, in beam B4 on frequency F1 during time interval T1, in beam B1 on frequency F2 during time interval T4, in beam B2 on frequency F2 during time interval T5, and in beam B3 on frequency F1 during time interval T7, thus using only free and available radio resources according to the ability information 600. The beam sequence 604 thus extends from start of time interval T0 to end of time interval T7 which is shorter than the predefined time period 502. Further, five time intervals T2, T3, T6, T8 and T9 are not used for transmission of reference signals, thus forming time gaps in the beam sequence 604 for node 1. As a result, the sum of the used time intervals T0, T1, T4, T5 and T7 in beam sequence 604 is therefore shorter than the total duration of the beam sequence 604 from T0 to T7, due to the occurrence of time gaps in the unused time intervals T2, T3, and T6. Note also that the beam specific ability information allows other beams to be transmitted in the same time interval and on the same carrier as another beam indicated as occupied. For instance, the control node could have chosen to schedule reference signal transmission from node 1 in beam B1 in time interval T4 on frequency F1.

FIG. 6 further illustrates a second beam sequence 606 for node 2 comprising a second subset of beams to be used by node 2 for transmission of reference signals. This beam sequence 606 dictates that a reference signal should be transmitted in beam C3 on frequency F2 during time interval T2, in beam C2 on frequency F2 during time interval T3, in beam C1 on frequency F2 during time interval T6, in beam C4 on frequency F1 during time interval T8, and in beam C5 on frequency F1 during time interval T9, thus using only free and available radio resources according to the ability information 602. The beam sequence 606 thus extends from start of time interval T2 to end of time interval T9 which is likewise shorter than the predefined time period 502. Further, five time intervals T0, T1, T4, T5 and T7 are not used for transmission of reference signals, thus forming time gaps in the beam sequence 606 for node 2. As a result, the sum of the used time intervals T2, T3, T6, T8 and T9 in beam sequence 606 is therefore shorter than the total duration of the beam sequence 604 from T2 to T9, due to the occurrence of time gaps in the unused time intervals T4, T5, and T7. Note also that the beam specific ability information allows other beams to be transmitted in the same time interval and on the same carrier as another beam indicated as occupied. For instance, the control node could have chosen to schedule reference signal transmission from node 2 in beam C4 in time interval T8 on frequency F2.

FIG. 6 further illustrates an aggregated or total beam sequence 608 for nodes 1 and 2 which is thus the sum of the above-described beam sequences 604 and 606. It can be seen that the aggregated beam sequence 608 extends from start of time interval T0 to end of time interval T9 thus filling the entire predefined time period 502. In FIG. 6, the aggregated beam sequence 608 has been determined to coordinate the beam transmissions from nodes 1 and 2 in such a manner that they will never transmit a reference signal at the same time, which could be used to avoid that two simultaneous transmissions of a reference signal from both nodes 1 and 2 collide or interfere with each other when received by a wireless device that tries to measure the individual reference signals separately.

However, a wireless device may be capable of receiving and measuring reference signals in two candidate beams at the same time, e.g. when reference signals are transmitted from different network nodes simultaneously on the same time/frequency resource, as long as the reference signals transmitted in the beams are uncorrelated and can be separated in the wireless device's receiver. This would be possible unless the wireless device is only capable of applying receiver beamforming in one direction at a time, e.g. when analogue receive beamforming is applied.

In the above-described examples it was assumed that the network nodes have enough available radio resources that are sufficient to enable transmission of reference signals in all the required candidate beams within the predefined time period. Specifically in FIG. 6 it is assumed that it is possible to find free, i.e. available, radio resources for both nodes 1 and 2, and to arrange the transmissions so that they will not occur at the same time, as described above, so as to avoid collisions and interference. However, sometimes there may not be enough available radio resources for a network node 202 to use for the above beam transmissions, e.g. when a large amount of radio resources are already scheduled for transmissions of data. In that case, the control node 200 may decide that the transmission of reference signals in candidate beams is more important and should take precedence over some of the other communication(s). In another example embodiment, the first network node 202 may thus be instructed to prioritize the transmissions of reference signals over transmissions of data in at least some of the beams of said sequence of beams.

It was mentioned above that the procedure illustrated in FIGS. 2 and 3 and embodiments thereof, may be performed by a control node which may be implemented in a central node, or in a network node of the wireless network such as the above-described first network node or a neighboring network node to which a wireless device may be handed over from the first network node. In another example embodiment, the control node 200 may operate in a source network node from which a wireless device, e.g. the wireless device 400 in FIG. 4, will potentially make a handover to the first network node 202 when the signal quality in at least one of the beams of said sequence of beams exceeds the signal quality from the source network node by a predefined margin. This predefined margin may be zero meaning that the handover will potentially be made once the signal quality in the beam(s) exceeds the signal quality from the source network node, or a value above zero meaning that the signal quality in the beam(s) must exceed a sum of the signal quality from the source network node and the margin before potentially making the handover.

In another example embodiment, the control node 200 may alternatively operate in the first network node 202 to enable handover of a wireless device, e.g. the wireless device 400 in FIG. 4, from a currently used beam to a new beam, such as beam B2 in FIG. 4, having a signal quality that exceeds the signal quality in the currently used beam by a predefined margin. This predefined margin may likewise be zero meaning that the handover will potentially be made once the signal quality in the new beam exceeds the signal quality in the currently used beam or a value above zero meaning that the signal quality in the new beam must exceed a sum of the signal quality in the currently used beam and the margin before potentially making the handover. In another example embodiment, the control node 200 may, in a third alternative, operate in a central entity configured to control beam transmissions from multiple network nodes of the wireless network. An example of the latter alternative is basically illustrated in FIG. 2 where the central control node 200 controls beam transmissions from the network nodes 202, 206 of the wireless network 204.

Another example of how the solution may be employed in terms of actions performed in a control node, such as the control node 200 of FIG. 2, for supporting transmissions of reference signals in spatially differentiated beams from a first network node of a wireless network, such as the network node 202 of FIG. 2, to enable measurement on the reference signals by any wireless device receiving the reference signals, will now be described with reference to the flow chart in FIG. 7. In a first action 700, the control node 200 sends an indication of a proposed sequence of beams to the first network node 202. The proposed sequence of beams may be a predefined "default" sequence or similar which may have been selected based on knowledge about the current traffic in the network.

When receiving the proposed beam sequence, the first network node 202 decides whether it can be accepted or not and returns a response to the control node 200 to indicate the above decision which depends on whether the radio resources required for the proposed beam sequence are available or not in the first network node 202. In a next action 702, the control node 200 determines whether the proposed beam sequence is accepted by the first network node 202 or not. If it is accepted, the control node 200 may according to one embodiment instruct the first network node 202, in another action 704, to transmit a reference signal in at least one beam at a time according to the proposed sequence of beams, assuming that the at least one beam is available and not used by the first network node 202 for any other communication(s) at said time. In an alternative embodiment, the indication of a proposed sequence of beams sent to the first network node 202 in action 700 may serve as an implicit instruction to the first network node 202, in case the proposed beam sequence can be accepted by the first network node 202, to also transmit a reference signal in at least one beam at a time according to the proposed sequence of beams. According to this embodiment, the control node 200 thus need not perform action 704.

If the proposed beam sequence is not accepted by the first network node 202, the control node 200 basically performs the method described above for FIG. 3, i.e. it obtains ability information from the first network node 202 and determines a sequence of beams based on the ability information, as indicated by another action 706. This action thus represents performing the actions 300-304 and optionally employing any of the example embodiments as described above.

Figure 8:
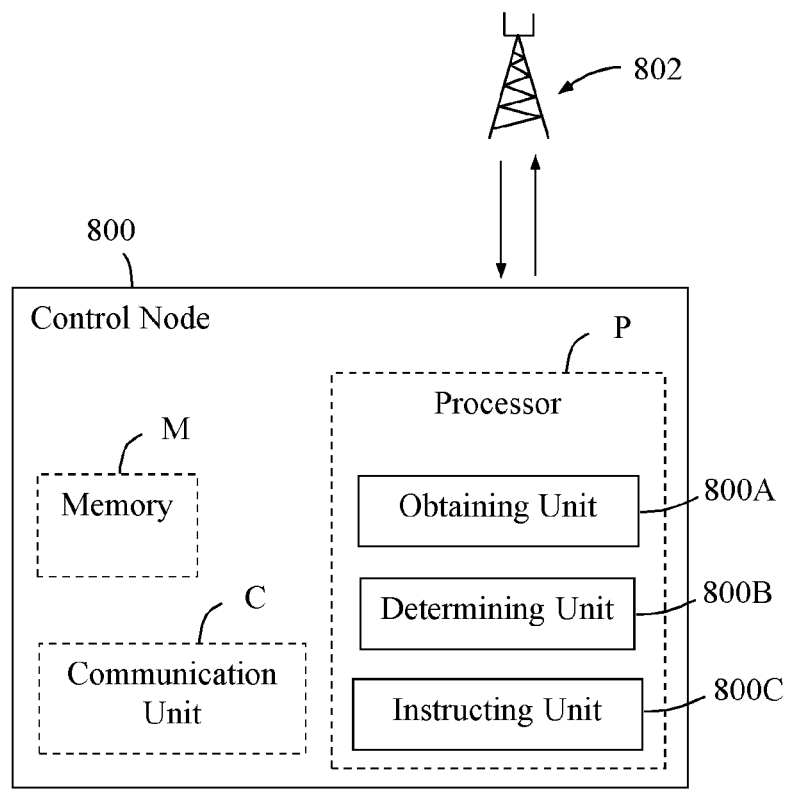
FIG. 8 is a block diagram illustrating a control node in more detail, according to further possible embodiments.

The block diagram in FIG. 8 illustrates a detailed but non-limiting example of how a control node 800 may be structured to bring about the above-described solution and embodiments thereof.

The control node 800 may thus be configured to operate according to any of the above-described examples and embodiments. The control node 800 is shown to comprise a processor P and a memory M, the memory M comprising instructions executable by said processor P whereby the control node 800 is operative as described herein. The control node 800 also comprises a communication unit C representing suitable equipment for receiving and sending information in the manner described herein. The communication unit C is configured for communication with network nodes of the wireless network over suitable interfaces such as the X2 interface, and using a suitable protocol for the described communication depending on the implementation. The solution and embodiments herein are thus not limited to using any specific types of networks, technology or protocols for communication.

Figure 7:
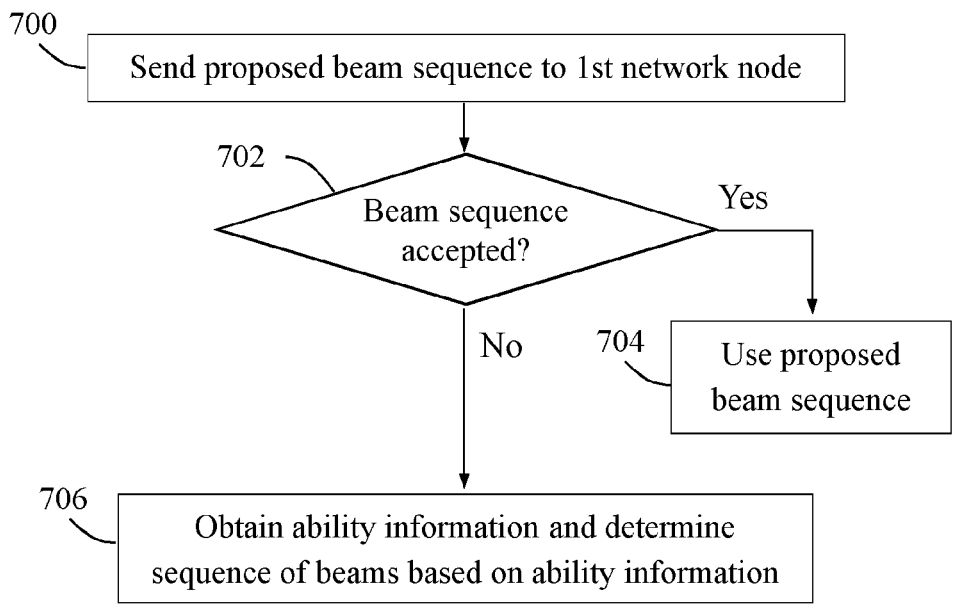
FIG. 7 is a flow chart illustrating another procedure in a control node, according to further possible embodiments.

The control node 800 comprises means configured or arranged to perform at least some of the actions of the flow charts in FIGS. 3 and 7. The control node 800 is arranged to support transmissions of reference signals in spatially differentiated beams from a first network node 802 of a wireless network to enable measurement on the reference signals by any wireless device receiving the reference signals.

The control node 800 is configured to obtain ability information from the first network node 802, the ability information indicating radio resources which the first network node 802 is able to use for beam transmissions during a predefined time period. This operation may be performed by an obtaining unit 800A in the control node 800, e.g. in the manner described for action 300 above.

The control node 800 is also configured to determine, based on the obtained ability information, a sequence of beams to be used for transmitting the reference signals from the first network node 802 during the predefined time period. This operation may be performed by a determining unit 800B in the control node 800, e.g. in the manner described for action 302 above.

The control node 800 may further be configured to instruct the first network node 802 to transmit reference signals in at least one beam at a time according to the determined sequence of beams. This operation may be performed by an instructing unit 800C in the control node 800, e.g. in the manner described for action 304 above.

In some embodiments, the control node 800 may further be configured to send an indication of a proposed sequence of beams to the first network node 802 and to receive a response from the first network node 802 as to whether or not the proposed beam sequence is accepted by the first network node 802. This operation may be performed by the communication unit C in the control node 800, e.g. in the manner described for action 700 above.

It should be noted that FIG. 8 illustrates that the control node 800 is configured with various functional units in the processor P according to one possible alternative, and the skilled person is able to implement these functional units in practice using suitable software and hardware. Thus, the solution is generally not limited to the shown structures of the control node 800, and the functional units 800A-C therein may be configured to operate according to any of the features and embodiments described in this disclosure, where appropriate.

Figure 8A:
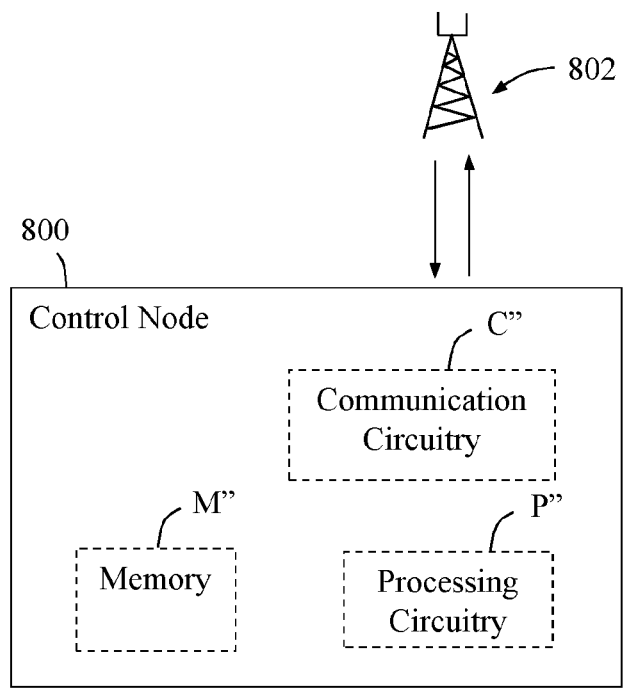
FIG. 8A is a block diagram illustrating another example of how a control node may be configured, according to further possible embodiments.

The functional units 800A-C described above could be implemented in the control node 800 by means of suitable hardware and program modules of a computer program comprising code means which, when run by the processor P causes the control node 800 to perform at least some of the above-described actions and procedures. FIG. 8A illustrates another possible alternative of how the control node 800 may be configured with memory M" and communication circuitry C" and processing circuitry P'". The memory M" comprises instructions executable by said processing circuitry P'" whereby the control node 800 is operative as described herein. The communication circuitry C" represents suitable equipment for receiving and sending information in the manner described herein and is configured for communication with network nodes of the wireless network over suitable interfaces such as the X2 interface, and using a suitable protocol for the described communication depending on the implementation. The solution and embodiments herein are thus not limited to using any specific types of networks, technology or protocols for communication. In either FIG. 8 or FIG. 8A, the processor P and processing circuitry P'" respectively may comprise a single Central Processing Unit (CPU), or could comprise two or more processing units. For example, the processor P and/or processing circuitry P'" may include a general purpose microprocessor, an instruction set processor and/or related chips sets and/or a special purpose microprocessor such as an Application Specific Integrated Circuit (ASIC). The processor P and/or processing circuitry P'" may also comprise a storage for caching purposes.

Each computer program may be carried by a computer program product in the control node 800 in the form of a memory having a computer readable medium and being connected to the processor P and/or processing circuitry P'". The computer program product or memory in the control node 800 may thus comprise a computer readable medium on which the computer program is stored e.g. in the form of computer program modules or the like. For example, the memory may be a flash memory, a Random-Access Memory (RAM), a Read-Only Memory (ROM), an Electrically Erasable Programmable ROM (EEPROM) or hard drive storage (HDD), and the program modules could in alternative embodiments be distributed on different computer program products in the form of memories within the control node 800.

The solution described herein may thus be implemented in the control node 800 by means of a computer program comprising instructions which, when executed on at least one processor, cause the at least one processor to carry out the actions according to any of the above features and embodiments, where appropriate. A suitable carrier containing the above computer program may also be used when implementing the solution, wherein the carrier is one of an electronic signal, optical signal, radio signal, a computer program storage product, or a computer readable storage medium.

Advantages of the above-described solution and its embodiments include that the first network node is more likely to be able to use the candidate beams in the beam sequence for transmitting reference signals, since the sequence should use radio resources which have been indicated as available by the first network node in the ability information. It can thus be avoided that a network node is not able to transmit a reference signal in one or more beams and time intervals as dictated by a given beam sequence.

When there are multiple network nodes involved, a network node may need to temporarily reserve the radio resources that it has indicated as available in the ability information. If it is critical to keep this reservation time as short as possible, it may be helpful to send an explicit message from the control node to the network nodes in case the determined beam sequence can be accepted by the network nodes. That way, the network nodes are informed as soon as possible of the finally selected beam sequence and can release the reservation of the radio resources in which they are not affected. This may possibly make the time period of reservation somewhat shorter than if each network node has to wait until it transmits its first beam and thereby knows that it will not receive any counter-instruction to change the beam sequence.

Even with the above described procedure there may still be a risk that it is not possible to determine an aggregated beam sequence for two or more network nodes which is possible to use by all network nodes. In such a case there may be two ways of handling the situation as follows:

The control node could change, e.g. increase and/or shift, the time period for the aggregated sequence of beams and initiate a new negotiation with the network nodes. This may delay the candidate beam transmissions e.g. used by a wireless device for handover or a beam switch, which might increase the risk of radio link failure for the wireless device.

The control node may choose to exclude one or more of the candidate beams in the sequence of beams in order to find a sequence that is possible to use by all network nodes. This may be indicated in a counter-instruction sent to the network nodes after the initial instruction. In that case a "suboptimal", i.e. not the best, beam may be selected by a wireless device for use after a handover or beam switch, because the best beam was excluded from the beam sequence in the counter-instruction.

Another possibility is that a network node does not reserve the radio resources that are indicated as available in the ability information and the control node has to view the ability information as the current momentary status in the network node. If it later turns out that the network node has conflicting commitments at a time when one or more of the beams should have been transmitted, then the network node could simply skip the beam(s) when transmitting the determined beam sequence. Optionally, a skipped beam may instead be transmitted after conclusion of the beam sequence. For example, the control node could allocate some time margin at the end of the beam sequence to allow skipped beams to be transmitted.

While the solution has been described with reference to specific exemplifying embodiments, the description is generally only intended to illustrate the inventive concept and should not be taken as limiting the scope of the solution. For example, the terms "control node", "network node", "beam", "reference signal", "ability information" and "wireless device" have been used throughout this disclosure, although any other corresponding entities, functions, and/or parameters could also be used having the features and characteristics described here. The solution is defined by the appended claims.

The invention claimed is:

1. A method performed by a control node for supporting transmissions of reference signals in spatially differentiated beams from a first network node of a wireless network to enable measurement on the reference signals by any wireless device receiving the reference signals, the method comprising:
   obtaining ability information from the first network node, the ability information indicating radio resources which the first network node is able to use for beam transmissions during a predefined time period;
   determining, based on the obtained ability information, a sequence of beams to be used for transmitting the reference signals from the first network node during the predefined time period; and
   instructing the first network node to transmit the reference signals in at least one beam at a time according to the determined sequence of beams.

2. A control node configured to support transmissions of reference signals in spatially differentiated beams from a first network node of a wireless network to enable measurement on the reference signals by any wireless device receiving the reference signals, the control node being configured to:
   obtain ability information from the first network node, the ability information indicating radio resources which the first network node is able to use for beam transmissions during a predefined time period;
   determine, based on the obtained ability information, a sequence of beams to be used for transmitting the reference signals from the first network node during the predefined time period; and
   instruct the first network node to transmit the reference signals consecutively in at least one beam at a time according to the determined sequence of beams.

3. The control node according to claim 2, wherein the determined sequence of beams specifies time intervals for transmitting beams of the determined sequence of beams.

4. The control node according to claim 3, wherein the time intervals are specified for the beams of the determined sequence of beams in terms of at least one timeslot of a radio frame.

5. The control node according to claim 3, wherein the determined sequence of beams further specifies that the reference signals in at least two beams of the determined sequence of beams be transmitted with different frequencies.

6. The control node according to claim 2, wherein the obtained ability information identifies beams and time intervals within the predefined time period and indicates whether the beams and time intervals are available or unavailable for transmissions by the first network node.

7. The control node according to claim 6, wherein the obtained ability information further indicates frequencies of the available or unavailable beams.

8. The control node according to claim 2, wherein the control node is configured to instruct the first network node to transmit beam-specific reference signals in the respective beams of the determined sequence of beams, to enable identification of the respective beams by any wireless device receiving the transmissions.

9. The control node according to claim 2, wherein the control node is configured to determine the sequence of beams further based on scheduling of transmissions one of to and from other network nodes of the wireless network so that any collisions or interference with other transmissions are at least minimized when the first network node transmits according to the determined sequence of beams.

10. The control node according to claim 2, wherein the control node is configured to send to the first network node an ability request indicating the predefined time period and to obtain the ability information in response to the ability request.

11. The control node according to claim 2, wherein the determined sequence of beams has a shorter duration than the predefined time period.

12. The control node according to claim 11, wherein the determined sequence of beams comprises at least one time gap where no reference signal is to be transmitted.

13. The control node according to claim 2, wherein the control node is configured to instruct the first network node to prioritize the transmissions of reference signals over transmissions of data in a plurality of the beams of the determined sequence of beams.

14. The control node according to claim 2, wherein the control node is configured to operate in a source network node from which a wireless device can potentially make a handover to the first network node when a signal quality in at least one of the beams of the determined sequence of beams exceeds the signal quality from the source network node with a predefined margin.

15. The control node according to claim 2, wherein the control node is configured to operate in the first network node to enable handover of a wireless device from a currently used beam to a new beam having a signal quality that exceeds the signal quality in the currently used beam with a predefined margin.

16. The control node according to claim 2, wherein the control node is configured to operate in a central entity configured to control beam transmissions in multiple network nodes of the wireless network.

17. A method performed by a control node for supporting transmissions of reference signals in spatially differentiated beams from a first network node of a wireless network to enable measurement of the reference signals by any wireless device receiving the reference signals, the method comprising:

sending an indication of a proposed sequence of beams to the first network node; and instructing the first network node to transmit, when the proposed sequence of beams is accepted by the first network node, a reference signal in at least one beam at a time according to the proposed sequence of beams.

18. The method according to claim 17, wherein the sending and the instructing are performed when the proposed sequence of beams is not accepted by the first network node.

19. A control node arranged to support transmissions of reference signals in spatially differentiated beams from a first network node of a wireless network to enable measurement of the reference signals by any wireless device receiving the reference signals, the control node is being configured to:

send an indication of a proposed sequence of beams to the first network node; and instruct the first network node to transmit, when the proposed sequence of beams is accepted by the first network node, a reference signal in at least one beam at a time according to the proposed sequence of beams.

20. The control node according to claim 19, wherein the sending and the instructing are performed when the proposed sequence of beams is not accepted by the first network node.

* * * * *